United States Patent
Ignatiev et al.

(10) Patent No.: US 10,782,050 B2
(45) Date of Patent: Sep. 22, 2020

(54) AMMONIA AND HYDROGEN ELECTROCHEMICAL CLIMATE CONTROL SYSTEMS

(71) Applicant: Emerson Climate Technologies, Inc., Sidney, OH (US)

(72) Inventors: Kirill M. Ignatiev, Sidney, OH (US); Michael M. Perevozchikov, Tipp City, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 100 days.

(21) Appl. No.: 16/043,985

(22) Filed: Jul. 24, 2018

(65) Prior Publication Data

US 2020/0033032 A1 Jan. 30, 2020

(51) Int. Cl.
*F25B 15/04* (2006.01)
*C09K 5/04* (2006.01)
(Continued)

(52) U.S. Cl.
CPC ............ *F25B 15/04* (2013.01); *B01D 53/326* (2013.01); *C09K 5/041* (2013.01);
(Continued)

(58) Field of Classification Search
CPC .................. C09K 5/041; B01D 53/326; B01D 2257/406; B01D 2256/16; F25B 15/04;
(Continued)

(56) References Cited

U.S. PATENT DOCUMENTS 4,593,534 A    6/1986   Bloomfield
5,688,433 A    11/1997   Kasahara et al.
(Continued)

OTHER PUBLICATIONS

International Search Report regarding Application No. PCT/US2019/043276 dated Oct. 25, 2019.
(Continued)

*Primary Examiner* — Steve S Tanenbaum
(74) *Attorney, Agent, or Firm* — Harness, Dickey & Pierce, P.L.C.

(57) ABSTRACT

An electrochemical climate control system circulates a working fluid comprising ammonia ($NH_3$) and hydrogen ($H_2$). An evaporator volatilizes liquid ammonia for a refrigeration effect. An electrochemical device can increase a total pressure of the working fluid and/or a first partial pressure of ammonia and decrease a second partial pressure of hydrogen when an f is applied. A condenser cools the working fluid/transforms ammonia to a liquid. A separator separates liquid ammonia from gas phase hydrogen. A heat exchanger may be provided downstream of the evaporator. The system may include an ejector combining vapor phase ammonia and gas phase hydrogen in a pressurized stream. A second electrochemical device is optionally included that decreases a pressure of gas phase hydrogen exiting the separator and which generates electrical potential that is transferred to the first electrochemical device. Such high efficiency systems may be free of any mechanical pumps or moving parts.

12 Claims, 3 Drawing Sheets

(51) Int. Cl.
*B01D 53/32* (2006.01)
*F25B 23/00* (2006.01)
*F25B 39/02* (2006.01)
*F25B 21/00* (2006.01)
*F25B 39/04* (2006.01)

(52) U.S. Cl.
CPC .... *B01D 2256/16* (2013.01); *B01D 2257/406* (2013.01); *F25B 21/00* (2013.01); *F25B 39/02* (2013.01); *F25B 39/04* (2013.01); *F25B 2500/21* (2013.01)

(58) Field of Classification Search
CPC ...... F25B 39/02; F25B 21/00; F25B 2500/21; F25B 39/04
USPC .......................................................... 62/495
See application file for complete search history.

(56) References Cited

U.S. PATENT DOCUMENTS

| | | |
|---|---|---|
| 6,321,561 B1 | 11/2001 | Maget |
| 8,769,972 B2 | 7/2014 | Bahar |
| 2016/0195308 A1* | 7/2016 | Kempiak ................. F25B 1/00 62/498 |
| 2018/0071678 A1* | 3/2018 | Ludlow ................ B01D 53/326 |

OTHER PUBLICATIONS

Written Opinion of the ISA/KR regarding Applilcation No. PCT/US2019/043276 dated Oct. 25, 2019.

Tao, Ye et al., "Performance Investigation on Electrochemical Compressor with Ammonia" (2016). *International Compressor Engineering Conference.* Paper 2469. http://docs/lib.purdue.edu/icec/2469.

* cited by examiner

AMMONIA AND HYDROGEN ELECTROCHEMICAL CLIMATE CONTROL SYSTEMS

FIELD

The present disclosure relates to climate control systems that include an electrochemical device and that circulate ammonia ($NH_3$) and hydrogen ($H_2$).

BACKGROUND

This section provides background information related to the present disclosure which is not necessarily prior art.

A conventional thermodynamic climate control system such as, for example, a heat-pump system, a refrigeration system, or an air conditioning system, may include a fluid circuit having a first heat exchanger (e.g., a condenser that facilitates a phase change of refrigerant from gas/vapor phase to a liquid phase) that is typically located outdoors, a second heat exchanger (e.g., evaporator that facilitates a phase change of refrigerant from liquid phase to gas/vapor phase) that is typically located indoors or within the environment to be cooled, an expansion device disposed between the first and second heat exchangers, and a compressor that operates via a vapor compression cycle (VCC) to circulate and pressurize a gas/vapor phase refrigerant (and optional lubricant oil) between the first and second heat exchangers. The compressor is typically a mechanical compressor that serves to pressurize the refrigerant, which can be subsequently condensed and evaporated as it is circulated within the system, so as to transfer heat into or out of the system.

Ammonia ($NH_3$) is a very efficient refrigerant and has no global warming impact. While ammonia has been used as a refrigerant for many years, it poses certain challenges in conventional refrigeration system configurations, for example, in a hermetic compressor driven by an electrical motor. Ammonia can be corrosive and thus incompatible with copper that is present in electrical motors and other equipment in conventional systems.

Since the 1930s, a pump-less absorption refrigeration system has been available, which employs refrigerant (typically ammonia), liquid absorbent (typically water) and inert gas (typically hydrogen). Addition of non-condensable inert gas which re-distributes itself through the system allows the system to operate at the same full pressure, while having different partial pressures of the refrigerant at different parts of the system. This unique design allowed for a refrigeration system to operate without any mechanical pumps, using only gravity, a heat source for desorption and heat exchange at an evaporator, a condenser and an absorber. Such a pump-less absorption refrigeration system is quiet and extremely reliable. However, using electric resistance heat as a heat source results in inherently lower efficiency compared to electric compressor-driven refrigeration systems. Due to the general trend to achieve higher energy efficiency, these systems have been ultimately replaced by those driven with the electric compressors.

Further, climate control systems that use a mechanical compressor for vapor control compression have efficiencies that are dependent on performance of the compressor. When compared to theoretical efficiencies associated with Carnot heat pumping limits, there is still significant room for improvement in efficiency. Therefore, it would be desirable to develop a climate-control system capable of effectively and efficiently providing cooling and/or heating as required.

It would be desirable to develop a climate control system that provides pump-less refrigeration (e.g., with no pumps, moving parts, and no oil) using ammonia as a refrigerant that provides high energy efficiencies.

SUMMARY

This section provides a general summary of the disclosure, and is not a comprehensive disclosure of its full scope or all of its features.

In certain variations, the present disclosure provides a climate control system. The climate control system may comprise a working fluid comprising ammonia ($NH_3$) and hydrogen ($H_2$). It may also comprise an evaporator that transforms liquid ammonia ($NH_3$) in the working fluid to a vapor phase. A heat exchanger may be disposed downstream of the evaporator. The climate control system may further comprise an electrochemical device that receives the working fluid from the heat exchanger comprising ammonia ($NH_3$) and hydrogen ($H_2$). The electrochemical device increases a first partial pressure of a vapor phase ammonia ($NH_3$) and decreases a second partial pressure of a gas phase hydrogen ($H_2$) as the working fluid passes through the electrochemical device when an electrical potential is applied thereto. A condenser is disposed downstream of the electrochemical device that cools the working fluid and transforms ammonia ($NH_3$) in the working fluid from the vapor phase to a liquid phase. A separator is disposed downstream of the condenser and upstream of the evaporator and the heat exchanger. The separator is configured to separate liquid phase ammonia ($NH_3$) from gas phase hydrogen ($H_2$) so that separated liquid phase ammonia ($NH_3$) is directed to the evaporator and transformed to vapor phase ammonia ($NH_3$) that is fed to the heat exchanger, while the gas phase hydrogen ($H_2$) exiting the separator is directed to the heat exchanger. The climate control system further comprises a fluid conduit for circulating the working fluid and establishing fluid communication between the evaporator, the heat exchanger, the electrochemical device, the condenser, and the separator, and through which the working fluid circulates.

In certain aspects, the separator is a first separator and the climate control system further comprises a second separator disposed between the electrochemical device and the condenser. The working fluid further comprises water ($H_2O$) and the second separator is configured to separate water ($H_2O$) from ammonia ($NH_3$) and hydrogen ($H_2$) in the working fluid after exiting the electrochemical device. The separated water ($H_2O$) is circulated back to the electrochemical device.

In certain aspects, the heat exchanger is a counterflow heat exchanger that has a first side in heat transfer relationship with a second side. The first side is configured to receive the gas phase hydrogen ($H_2$) exiting the separator and the second side is configured to receive a feed stream of the working fluid to be directed to the electrochemical device. The feed stream comprises vapor phase ammonia ($NH_3$) exiting the evaporator. The heat exchanger is configured to transfer heat from the first side to the second side to cool the gas phase hydrogen ($H_2$) and heat the feed stream.

In certain further aspects, after the gas phase hydrogen ($H_2$) exits the first side of the heat exchanger as a cooled gas phase hydrogen ($H_2$), at least a portion of the cooled gas phase hydrogen ($H_2$) is introduced into the feed stream prior to entering the second side of the heat exchanger.

In certain aspects, the climate control system is free of any mechanical pumps or moving parts.

In certain aspects, the electrochemical device comprises a positive electrode, a negative electrode, a separator membrane that permits transport of ammonium ($NH_4^-$) ions therethrough.

In certain aspects, the first partial pressure of the vapor phase ammonia ($NH_3$) entering the electrochemical device is less than or equal to about 50% of a total pressure of the working fluid and the second partial pressure of the gas phase hydrogen ($H_2$) is greater than or equal to about 50% of the total working pressure of the working fluid. Further, the first partial pressure of the vapor phase ammonia ($NH_3$) exiting the electrochemical device is greater than or equal to about 50% of a total pressure of the working fluid and the second partial pressure of the gas phase hydrogen ($H_2$) is less than or equal to about 50% of the total working pressure of the working fluid.

In other variations, the present disclosure provides a climate control system that comprises a working fluid comprising ammonia ($NH_3$) and hydrogen ($H_2$). The climate control system comprises an evaporator that transforms liquid phase ammonia ($NH_3$) in the working fluid to a vapor phase. The climate control system also comprises an ejector configured to combine and create a pressurized stream of working fluid comprising vapor phase ammonia ($NH_3$) received from the evaporator and a distinct stream of a gas phase hydrogen ($H_2$). An electrochemical device receives the pressurized stream of working fluid from the ejector to further increase pressure of the working fluid as the working fluid passes through the electrochemical device when an electrical potential is applied thereto. A condenser is disposed downstream of the electrochemical device that cools the working fluid and transforms vapor phase ammonia ($NH_3$) in the working fluid to a liquid phase. A separator is disposed downstream of the condenser and upstream of the evaporator and the ejector, where the separator is configured to separate liquid phase ammonia ($NH_3$) from gas phase hydrogen ($H_2$) so that separated liquid phase ammonia ($NH_3$) is directed to the evaporator and transformed to vapor phase ammonia ($NH_3$) that is fed to the ejector. The separated gas phase hydrogen ($H_2$) forms the distinct stream that is fed to the ejector. The climate control system also comprises a fluid conduit for circulating the working fluid and establishing fluid communication between the evaporator, the ejector, the electrochemical device, the condenser, and the separator.

In certain aspects, the separator is a first separator and the climate control system further comprises a second separator disposed between the electrochemical device and the condenser. The working fluid further comprises water ($H_2O$) and the second separator is configured to separate water ($H_2O$) from ammonia ($NH_3$) and hydrogen ($H_2$) in the working fluid after exiting the electrochemical device. The separated water ($H_2O$) is circulated back to the electrochemical device.

In certain aspects, the ejector has a first inlet that receives vapor phase ammonia ($NH_3$) from the evaporator and a second inlet that receives gas phase hydrogen ($H_2$). The pressurized stream has a pressure that is at least 10% greater than a first pressure of vapor phase ammonia ($NH_3$) from the evaporator. In certain variations, the pressurized stream may have a pressure that is at least 10% greater than a second pressure of gas phase hydrogen ($H_2$) from the separator.

In certain aspects, the electrochemical device increases a first partial pressure of vapor phase ammonia ($NH_3$) and decreases a second partial pressure of gas phase hydrogen ($H_2$) as the working fluid passes through the electrochemical device when an electrical potential is applied thereto.

In certain aspects, the first partial pressure of vapor phase ammonia ($NH_3$) entering the electrochemical device is less than or equal to about 50% of a total pressure of the working fluid and the second partial pressure of gas phase hydrogen ($H_2$) is greater than or equal to about 50% of the total working pressure of the working fluid. The first partial pressure of gas phase ammonia ($NH_3$) exiting the electrochemical device is greater than or equal to about 50% of a total pressure of the working fluid and the second partial pressure of gas phase hydrogen ($H_2$) is less than or equal to about 50% of the total working pressure of the working fluid.

In certain aspects, the climate control system is free of any mechanical pumps or moving parts.

In certain aspects, the electrochemical device comprises a positive electrode, a negative electrode, and a separator membrane that permits transport of ammonium ($NH_4^+$) ions therethrough.

In yet other variations, the present disclosure provides a climate control system comprising a working fluid comprising ammonia ($NH_3$) and hydrogen ($H_2$). The system also comprises an evaporator that transforms liquid ammonia ($NH_3$) in the working fluid to a vapor phase. A first electrochemical device is provided that receives the working fluid from the evaporator comprising vapor phase ammonia ($NH_3$) and gas phase hydrogen ($H_2$), wherein the first electrochemical device increases a pressure of the working fluid passing through the first electrochemical device when an electrical potential is applied thereto. A condenser is disposed downstream of the first electrochemical device that cools the working fluid and transforms ammonia ($NH_3$) in the working fluid from a vapor phase to a liquid phase. The system also comprises a separator disposed downstream of the condenser. The separator is configured to separate liquid ammonia ($NH_3$) from gas phase hydrogen ($H_2$) so that separated liquid phase ammonia ($NH_3$) is directed to the evaporator and transformed to vapor phase ammonia ($NH_3$) that is fed to the first electrochemical device. The separated gas phase hydrogen ($H_2$) is directed to a second electrochemical device. The system also comprises a second electrochemical device configured to receive and decrease a pressure of gas phase hydrogen ($H_2$) from the separator and generate electrical power that is transferred to the first electrochemical device. A fluid conduit is also provided for circulating the working fluid and establishing fluid communication between the evaporator, the first electrochemical device, the condenser, the separator, and the first electrochemical device.

In certain aspects, the separator is a first separator and the climate control system further comprises a second separator disposed between the first electrochemical device and the condenser. The working fluid further comprises water ($H_2O$) and the second separator is configured to separate water ($H_2O$) from ammonia ($NH_3$) and hydrogen ($H_2$) in the working fluid after exiting the first electrochemical device. The separated water ($H_2O$) is circulated back to the first electrochemical device.

In certain aspects, the climate control system is free of any mechanical pumps or moving parts.

In certain aspects, the first electrochemical device comprises a first positive electrode, a first negative electrode, a first separator membrane that permits transport of ammonium ($NH_4^+$) ions therethrough and the second electrochemical device comprises a second positive electrode, a second negative electrode, and a second separator membrane that permits transport of protons ($H^+$) therethrough.

In certain aspects, the first electrochemical device increases a first partial pressure of vapor phase ammonia ($NH_3$) and decreases a second partial pressure of gas phase hydrogen ($H_2$) as the working fluid passes through the first electrochemical device when an electrical potential is applied thereto.

In certain aspects, the first partial pressure of vapor phase ammonia ($NH_3$) entering the first electrochemical device is less than or equal to about 50% of a total pressure of the working fluid. Further, the second partial pressure of gas phase hydrogen ($H_2$) is greater than or equal to about 50% of the total working pressure of the working fluid. The first partial pressure of gas phase ammonia ($NH_3$) exiting the first electrochemical device is greater than or equal to about 50% of a total pressure of the working fluid and the second partial pressure of gas phase hydrogen ($H_2$) is less than or equal to about 50% of the total working pressure of the working fluid.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower,"

"above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

In various aspects, the present disclosure provides a climate control system, such as a refrigeration system, that employs a binary working fluid composition comprising ammonia ($NH_3$) and hydrogen ($H_2$), to provide a pump-less refrigeration system incorporating an electrochemical device.

Figure 1:
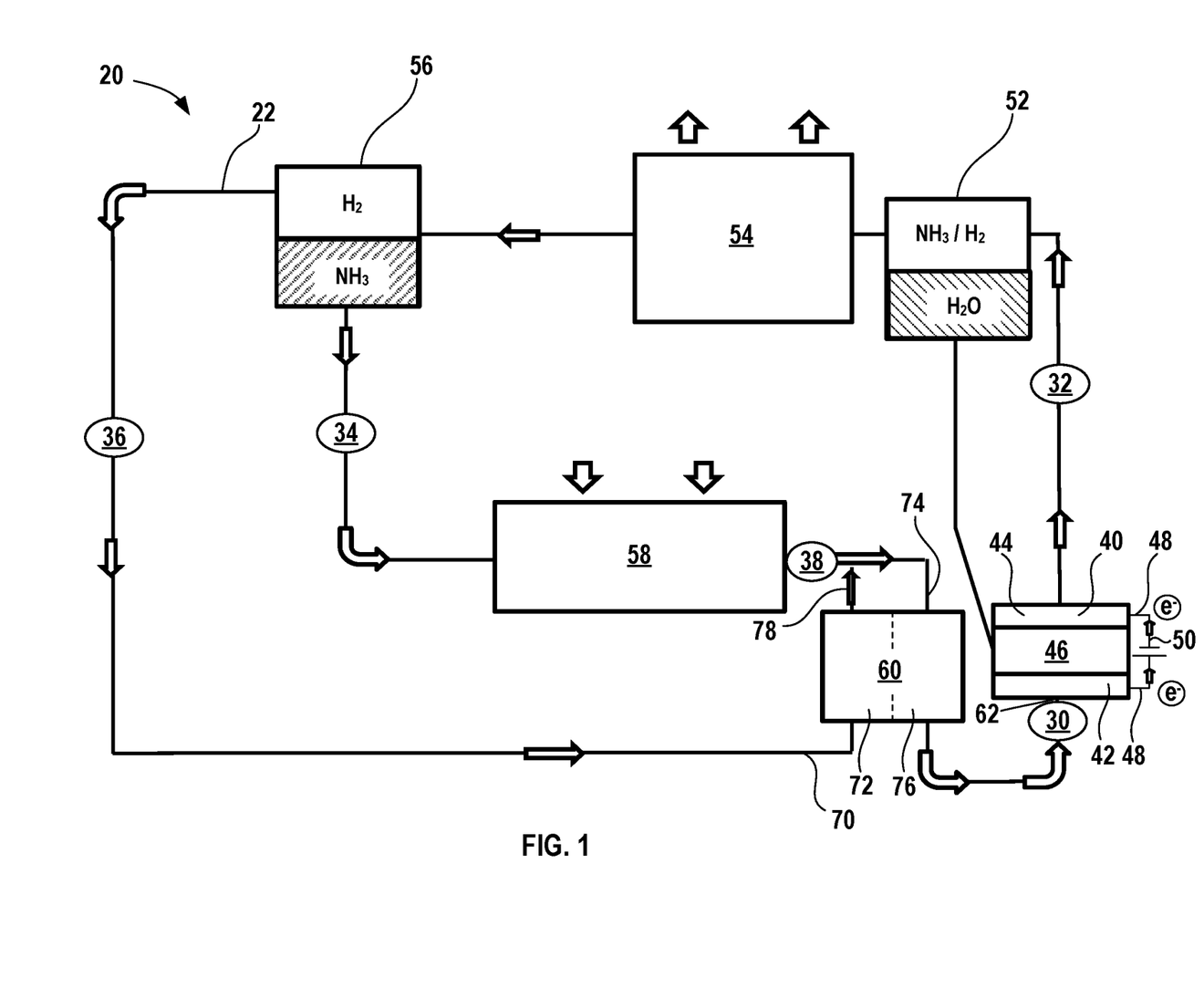
FIG. 1 illustrates a first electrochemical climate control system according to certain aspects of the present disclosure that processes a working fluid comprising ammonia ($NH_3$) and hydrogen ($H_2$) and contains an electrochemical device.

FIG. 1 shows a schematic of an exemplary simplified electrochemical climate control system 20, such as a refrigeration system, that processes and circulates a working fluid having a composition comprising ammonia ($NH_3$) and hydrogen ($H_2$). The working fluid may also include water ($H_2O$) at certain points in the system, as will be described in greater detail below. The term "fluid" as used herein encompasses liquid, gas, and any combinations thereof, including vapor (e.g., a gas phase having aerosolized liquid droplets). The term gas or gas phase as used herein is intended to encompass both vapor and pure gas phases. In accordance with certain aspects of the present disclosure, the working fluid may have a substantially constant pressure throughout the system 20, but the partial pressures of the mixtures of ammonia ($NH_3$) and hydrogen ($H_2$) may vary throughout the system 20. For example, partial pressures of ammonia generally correspond to evaporative and condensing saturation pressures respectively, which are determined by the evaporative and condensing temperatures of the refrigeration system. Partial pressures of hydrogen are self-redistributed in such a way that the full pressures in different parts of the system are the same, however those partial pressures depend on the system internal volume, amount of hydrogen charge and temperatures in different parts of the electrochemical climate control system 20.

In one aspect, an amount of hydrogen charge in the working fluid is selected so that the partial pressures of hydrogen remain positive during operation within the required range of operational evaporative and condensing temperatures of the electrochemical climate control system 20. For example, in a typical air conditioning system, saturation condensing temperatures are around about 100° F. most of the time, but may increase up to about 150° F. This corresponds to a partial ammonia pressure variation of greater than or equal to about 212 psia to less than or equal to about 434 psia. At the same time, saturation evaporative temperatures are typically around 45° F., which corresponds to a partial saturation pressure of ammonia of 66 pounds per square inch absolute (psia). Therefore, an amount of hydrogen charge in the working fluid within the electrochemical climate control system 20 is selected to be high enough to be able to result in a partial pressure of at least 368 psia in a part of the system 20 with lower partial pressure of ammonia to be able to reach the equilibrium of full pressure everywhere in the system 20.

In accordance with certain aspects of the present disclosure, a working fluid may have a first partial pressure of ammonia ($NH_3$) that increases and a second partial pressure of hydrogen ($H_2$) that decreases as the working fluid passes through an electrochemical device when an electrical potential or voltage is applied thereto. For example, ammonia ($NH_3$) and hydrogen ($H_2$) react to generate ammonium ($NH_4^+$) and electrons on a first side (negative electrode or anode) of the electrochemical device, as shown in Equation 1:

$$2NH_3 + H_2 \rightarrow 2NH_4^+ + 2e^- \quad \text{(Eqn. 1)}.$$

The partial pressure of ammonia ($NH_3$) may be relatively low on the negative electrode side, while the partial pressure of hydrogen ($H_2$) is relatively high, as explained above. The electrochemical device may have a separator that permits ammonium cations ($NH_4^+$) to pass through to the positive electrode or cathode side of the electrochemical device, where the reaction shown in Equation 2 takes place:

$$2NH_4^+ + 2e^- \rightarrow 2NH_3 + H_2 \quad \text{(Eqn. 2)}.$$

Electrons are transferred via an external circuit from the negative electrode to the positive electrode. The partial pressure of ammonia ($NH_3$) may be relatively high after passing through the electrochemical cell as it exits from the positive electrode side, while the partial pressure of hydrogen ($H_2$) may be relatively low as it exits the electrochemical cell. Thus, the partial pressure of ammonia ($NH_3$) increases as it passes through an electrochemical cell, while the partial pressure of hydrogen ($H_2$) decreases, while the overall total pressure of the working fluid remains substantially the same. During this electrochemical process, a ratio of hydrogen and ammonia transfer rates through a separator membrane 46 is governed by the Equation (1). The transfer rate is a function of electric current applied to the membrane and generally independent of the partial pressures of hydrogen and ammonia. Because the full pressures of gas mixtures on both sides of the membrane are equal or near equal to one another, there is little to no mechanical stress on the membrane due to a pressure differential, which simplifies the membrane assembly in the electrochemical device and relieves requirements for its mechanical strength.

With renewed reference to FIG. 1, the electrochemical climate control system 20 has a fluid flow path or fluid conduit 22 that establishes fluid communication between the various components, so that the working fluid may circulate in a loop as discussed further herein. At point 30 in the fluid conduit 22, the working fluid comprises a combination of both ammonia ($NH_3$) and hydrogen ($H_2$) that are both in gas phase. As noted above, a first partial pressure for hydrogen ($H_2$) is substantially greater than a second partial pressure for ammonia ($NH_3$) in the working fluid at point 30. In certain variations, the first partial pressure of hydrogen ($H_2$) is greater than about 50% of the overall total pressure of the working fluid prior to entering the electrochemical device 40, optionally greater than or equal to about 60%, optionally greater than or equal to about 66%, optionally greater than or equal to about 70%, optionally greater than or equal to about 75%, optionally greater than or equal to about 80% of the overall total pressure of the working fluid as the working fluid enters an electrochemical device 40. Conversely, the second partial pressure of ammonia ($NH_3$) is less than about 50% of the overall total pressure of the working fluid prior to entering the electrochemical device 40, optionally less than or equal to about 40%, optionally less than or equal to about 33%, optionally less than or equal to about 30%, optionally less than or equal to about 25%, and in certain variations, optionally less than or equal to about 20% of the overall total pressure of the working fluid as it enters the electrochemical device 40. Next, the working fluid passes into an electrochemical device 40 having a negative electrode or anode 42, a positive electrode or cathode 44, and the separator membrane 46.

The separator membrane 46 may be a porous solid polymeric separator membrane that is electrically insulating, but permits ions like ammonium cations ($NH_4^+$) to pass there through (e.g., an ionomer). Water ($H_2O$) may be added to the system to improve the functionality of the separator membrane 46, for example, to improve ionic conductivity. The anode 42 and cathode 44 may be porous structures that permit working fluid to flow there through. The anode 42 and cathode 44 may include very finely divided catalytic particles (e.g., platinum particles) supported on internal and external surfaces of conductive carbon particles, and proton conductive material intermingled with the catalytic and carbon particles, by way of example. Each electrode (anode 42 and cathode 44) may include a respective current collector (not shown in the simplified depiction of electrochemical device 40) that is connected to a terminal or tab 48. Conductive tabs 48 may be connected to an external circuit 50 through which electrons may flow when voltage/potential is applied to the electrochemical device 40.

When voltage is applied to the system via an external power source (not shown), ammonium cations ($NH_4^+$) and electrons ($e^-$) are transferred from the anode 42 to the cathode 44. The ammonium cations ($NH_4^+$) pass through the separator membrane 46 to the cathode 44. The electrons generated pass through the external circuit 50. The ammonium cations ($NH_4^+$) travel through separator membrane 46 to the cathode 44 side by electrical field; while electrons travel to cathode 44 by the electrical power supply circuit.

In this manner, the second partial pressure of the ammonia ($NH_3$) is increased in the electrochemical device 40, while the first partial pressure of hydrogen ($H_2$) decreases. Thus, at point 32, the working fluid exiting the electrochemical device 40 comprises a combination of both ammonia ($NH_3$) and hydrogen ($H_2$) that are both in vapor or gas phase. In certain variations, the second partial pressure of ammonia ($NH_3$) at point 32 is greater than about 50% of the overall total pressure of the working fluid as it exits the electrochemical device 40, optionally greater than or equal to about 60%, optionally greater than or equal to about 66%, optionally greater than or equal to about 70%, optionally greater than or equal to about 75%, optionally greater than or equal to about 80% of the overall total pressure of the working fluid as the working fluid exits the electrochemical device 40. Conversely, the first partial pressure of hydrogen ($H_2$) is less than about 50% of the overall total pressure of the working fluid as it exits the electrochemical device 40, optionally less than or equal to about 40%, optionally less than or equal to about 33%, optionally less than or equal to about 30%, optionally less than or equal to about 25%, and in certain variations, optionally less than or equal to about 20% of the overall total pressure of the working fluid as it exits the electrochemical device 40. It should be noted that in this or any other embodiments described herein, that the electrochemical device 40 may include multiple electrochemical cells (each comprising an anode, separator membrane, and cathode) and thus, a stack or plurality of electrochemical devices are thus contemplated.

Next, the working fluid passes into a first separator that serves as a water separator 52. As noted above, water may be present in the system 20, including in the working fluid, to improve functionality of the separator membrane 46. Thus, as the working fluid passes out of the electrochemical device 40, it may pass through the water separator 52, where vapor phase ammonia ($NH_3$) and gas phase hydrogen ($H_2$) are separated from water ($H_2O$). After the water is removed from the working fluid, the separated water ($H_2O$) is then circulated back to the electrochemical device 40 for humidification of the separator membrane 46.

After exiting the water separator 52, the working fluid comprising ammonia ($NH_3$) and hydrogen ($H_2$) next enters a first heat exchanger in the form of a condenser 54. In the condenser 54, ammonia ($NH_3$) transforms from a vapor phase to a liquid phase, while hydrogen ($H_2$) remains as a gas phase as it exits the condenser 54. In the condenser 54, the working fluid is cooled and expels heat from the electrochemical climate control system 20, as shown by the arrows. The condenser 54 may be located in a room or space where heat may be expelled, for example, outdoors. Next, the working fluid passes into a second separator that serves as an ammonia separator 56. The liquid phase ammonia ($NH_3$) is thus separated from vapor phase hydrogen ($H_2$) in the ammonia separator 56. The working fluid at this point is thus separated into two distinct streams, a first stream comprising liquid ammonia ($NH_3$) at point 34 and a second stream comprising gas phase hydrogen ($H_2$) at point 36. Hydrogen from the ammonia separator 56 is thus directed into and combined with an ammonia-containing stream exiting an evaporator 58 (or into the evaporator) through a heat exchanger 60, so it balances the full pressure to be the same throughout the electrochemical climate control system 20. It should be noted that separation efficiency may not be 100% and therefore small amounts of the ammonia may be present in the hydrogen stream (second stream shown at point 36) and vice versa, namely that small amounts of hydrogen may be present in the first stream containing predominantly ammonia (at point 34).

The liquid ammonia ($NH_3$) in the first stream next passes (e.g., by gravity feed) into another heat exchanger in the form of the evaporator 58. The evaporator 58 causes ammonia ($NH_3$) in first stream to transform from a liquid to a vapor at point 38, where the cooling effect of endothermic energy absorption is shown by arrows. The evaporator 58 may be located in a room or space to be cooled by the electrochemical climate control system 20 or used to cool air flowing into a room or space in which cooling is desired. The vapor phase ammonia ($NH_3$) then enters a heat exchanger 60.

The heat exchanger 60 is disposed downstream of the evaporator 58 and upstream of the electrochemical device

40. The heat exchanger 60 is configured to pass working fluid to an inlet 62 of the electrochemical device 40. The heat exchanger 60 may be any suitable type known in the art. The heat exchanger 60 also receives the second stream comprising gas phase hydrogen ($H_2$) exiting the ammonia separator 56 at point 36. More specifically, in the heat exchanger 60, there is a countercurrent or counterflow heat exchange between a gas phase hydrogen ($H_2$) stream 70 originating from the ammonia separator 56 on a first side 72 and a feed stream 74 on a second side 76 that includes working fluid that will enter the inlet 62 of the electrochemical device 40. The first side 72 is in heat transfer relationship with the second side 76, so that heat may be transferred from the first side 72 (to cool the stream passing therethrough) to the second side 76 (to heat the stream passing therethrough). After the hydrogen ($H_2$) stream 70 passes through the heat exchanger 60, at least a portion 78 exiting is cooled and combines with vapor ammonia ($NH_3$) just prior to entering the heat exchanger 60 and thus forms the feed stream 74. The feed stream 74 is thus heated in the heat exchanger 60 and passes into the inlet of the electrochemical device 40, where the working fluid can recirculate in the manner described above. It should be noted that FIG. 1 is a simplified, representative depiction of the electrochemical climate control system 20 and thus omits various conventional components used in such systems, including various controllers, temperature and pressure gauges, flow routing valves and systems, and the like.

In various aspects as noted above, the electrochemical climate control system 20 can operate at the same full pressure everywhere throughout the fluid conduit 22, but has different partial pressures of the components of the binary mixture in the working fluid, thus operating much like a conventional pump-less absorption system. However, electrochemical climate control system 20 is driven by an electrochemical compressor, instead of heat, so it exhibits much higher efficiency. As recognized by those of skill in the art, circulation in the system and functionality of the various components in FIG. 1 may be modified to provide a reverse effect from cooling, for example, transferring heat where desired into a room or enclosed space, rather than removing heat from that room or enclosed space.

Figure 2:
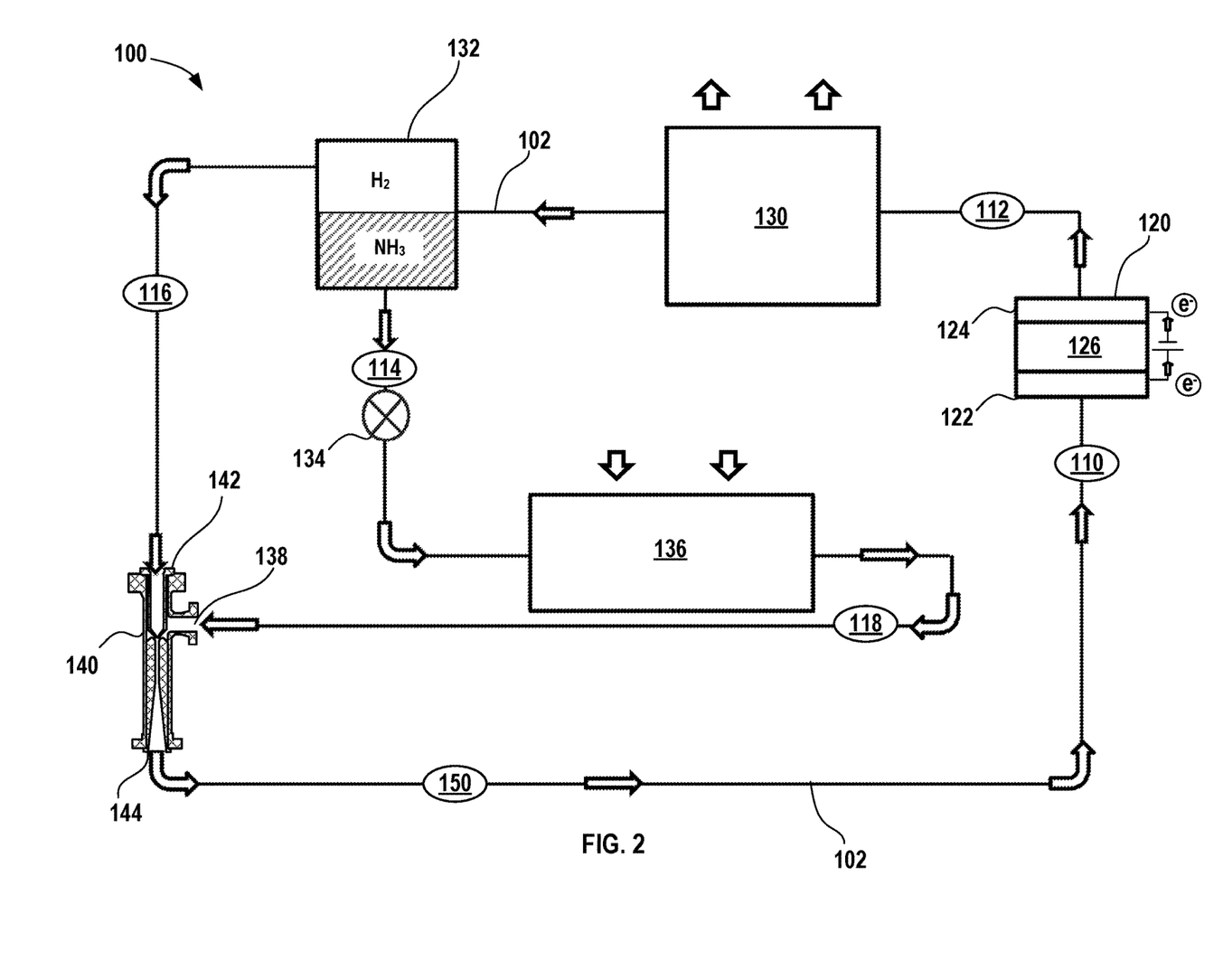
FIG. 2 illustrates a second electrochemical climate control system according to certain aspects of the present disclosure that processes a working fluid comprising ammonia ($NH_3$) and hydrogen ($H_2$) and contains an electrochemical device and an ejector.

In FIG. 2, another variation of an electrochemical climate control system 100 is shown that processes and circulates a working fluid having a composition comprising ammonia ($NH_3$) and hydrogen ($H_2$). The working fluid may also include water ($H_2O$) at certain points in the system. In certain aspects, the working fluid in such an embodiment may have different total pressures at different points throughout the system 100. To the extent that the components are similar to those described in FIG. 1 above, for brevity, the detail of their composition and operation will not be repeated unless otherwise noted herein. The electrochemical climate control system 100 has a fluid flow path or fluid conduit 102 that establishes fluid communication between the various components, so that the working fluid may circulate in a loop as discussed further herein. At point 110 in the fluid conduit 102, the working fluid comprises a combination of both ammonia ($NH_3$) and hydrogen ($H_2$) that are in a vapor phase and gas phase respectively. Similar to the embodiment in FIG. 1, a first partial pressure for hydrogen ($H_2$) may be substantially greater than a second partial pressure for ammonia ($NH_3$) in the working fluid at point 110. At point 110, the working fluid has a relatively low pressure. Next, the working fluid passes into an electrochemical device 120 having a negative electrode or anode 122, a positive electrode or cathode 124, and a separator membrane 126. Notably, the external circuit, current collectors, terminals, tabs, and external power source are not shown in FIG. 2. The electrochemical device 120, including anode 122, cathode 124, and separator membrane 126 may be the same as and operated like those described above in the context of FIG. 1. As noted previously, water ($H_2O$) may be added to the system to improve the functionality of the separator membrane 126, for example, and the system 100 may include a water separator (not shown in FIG. 2) to recover water from the working fluid as it exits the electrochemical device 120, so that water is recycled back to the separator membrane 126.

In this manner, at point 112, the working fluid exiting the electrochemical device 120 has a higher total pressure and comprises a combination of both ammonia ($NH_3$) in a vapor phase and hydrogen ($H_2$) in a gas phase. Further, the second partial pressure of the ammonia ($NH_3$) may be increased in the electrochemical device 120, while the first partial pressure of hydrogen ($H_2$) decreases. The working fluid comprising ammonia ($NH_3$) and hydrogen ($H_2$) next enters a condenser 130. In the condenser 130, ammonia ($NH_3$) transforms from a vapor phase to a liquid phase, while hydrogen ($H_2$) remains as a gas phase as it exits the condenser 130. In the condenser 130, the working fluid is cooled and expels heat from the electrochemical climate control system 100, as shown by the arrows. The condenser 130 may be located in a room or space where heat may be expelled, for example, outdoors. Next, the working fluid passes into a separator that serves as an ammonia separator 132. The liquid phase ammonia ($NH_3$) is thus separated from gas phase hydrogen ($H_2$) in the ammonia separator 132. The working fluid at this point is thus separated into two distinct streams, a first stream (designated by point 114) that comprises liquid ammonia ($NH_3$) and a second stream (designated by point 116) that comprises gas phase hydrogen ($H_2$). As discussed above, separation efficiency may not be 100% and therefore small amounts of the ammonia may be present in the predominantly hydrogen-containing second stream 116 and vice versa, namely that small amounts of hydrogen may be present in the ammonia-containing first stream 114.

The liquid ammonia ($NH_3$) in the first stream 114 next passes into an expansion valve 134. The expansion valve 134 causes ammonia ($NH_3$) in first stream 114 to expand, so that pressure is removed from the liquid refrigerant to allow expansion or change of state from a liquid to a gas in an evaporator 136. Cooling of the liquid ammonia ($NH_3$) accompanies the loss of pressure after passing through the expansion valve 134. The presence of the expansion valve 134 provides an electrochemical climate control system having different full or total pressures at different points in the system 100 in contrast to previously described embodiments. Thus, pressures in such a climate control system 100 are thus similar to those in conventional compressor driven refrigeration systems.

Next, the liquid ammonia ($NH_3$) passes into the evaporator 136 to transform from a liquid to a vapor at point 118 to provide necessary refrigeration effect, shown by arrows. The evaporator 136 may be located in a room or space to be cooled by the electrochemical climate control system 100 or used to cool air flowing into a room or space in which cooling is desired. The vapor phase ammonia ($NH_3$) exiting the evaporator 136 is directed to a first inlet 138 of an ejector 140. The ejector 140 is disposed downstream of the evaporator 136 and upstream of the electrochemical device 120. In a second inlet 142, the ejector 140 also receives the second stream 116 comprising gas phase hydrogen ($H_2$) exiting the ammonia separator 132. The ejector 140 is configured to combine and create a pressurized stream (e.g., having an increased or higher pressure) of gas phase hydrogen ($H_2$) and vapor phase ammonia ($NH_3$), which exits at outlet 144. As a result of passing through the ejector 140, a vapor phase ammonia ($NH_3$) leaving the evaporator 136 is compressed together with gas phase hydrogen ($H_2$) to form a pressurized stream at point 150 that has a first pressure higher than a second pressure of the stream exiting the evaporator 136 at point 118 and lower than a third pressure of the stream of hydrogen gas at point 116 exiting the ammonia separator 132. Therefore, a mixture of vapor ammonia ($NH_3$) and gas phase hydrogen ($H_2$) leaves the ejector 140 and enters the electrochemical device compressor 120 at a pressure higher than the evaporator 136 pressure, so the compression work is reduced.

In certain variations, the pressurized stream at point 150 has a first pressure that is at least 10% greater than the second pressure of the gas phase ammonia ($NH_3$) exiting the evaporator 136 at point 118. Thus, the working fluid exiting an outlet 144 of the ejector 140 is a mixture of vapor ammonia ($NH_3$) and hydrogen ($H_2$) gas that enters the electrochemical device 120 at a pressure higher than the evaporator 136 pressure, which reduces an amount of compression work to be accomplished by the electrochemical device 120 and therefore increases the system performance while also reducing the pressure differential applied to the membrane 126. Thus, the working fluid is circulated to the electrochemical device 120 as described above.

Figure 3:
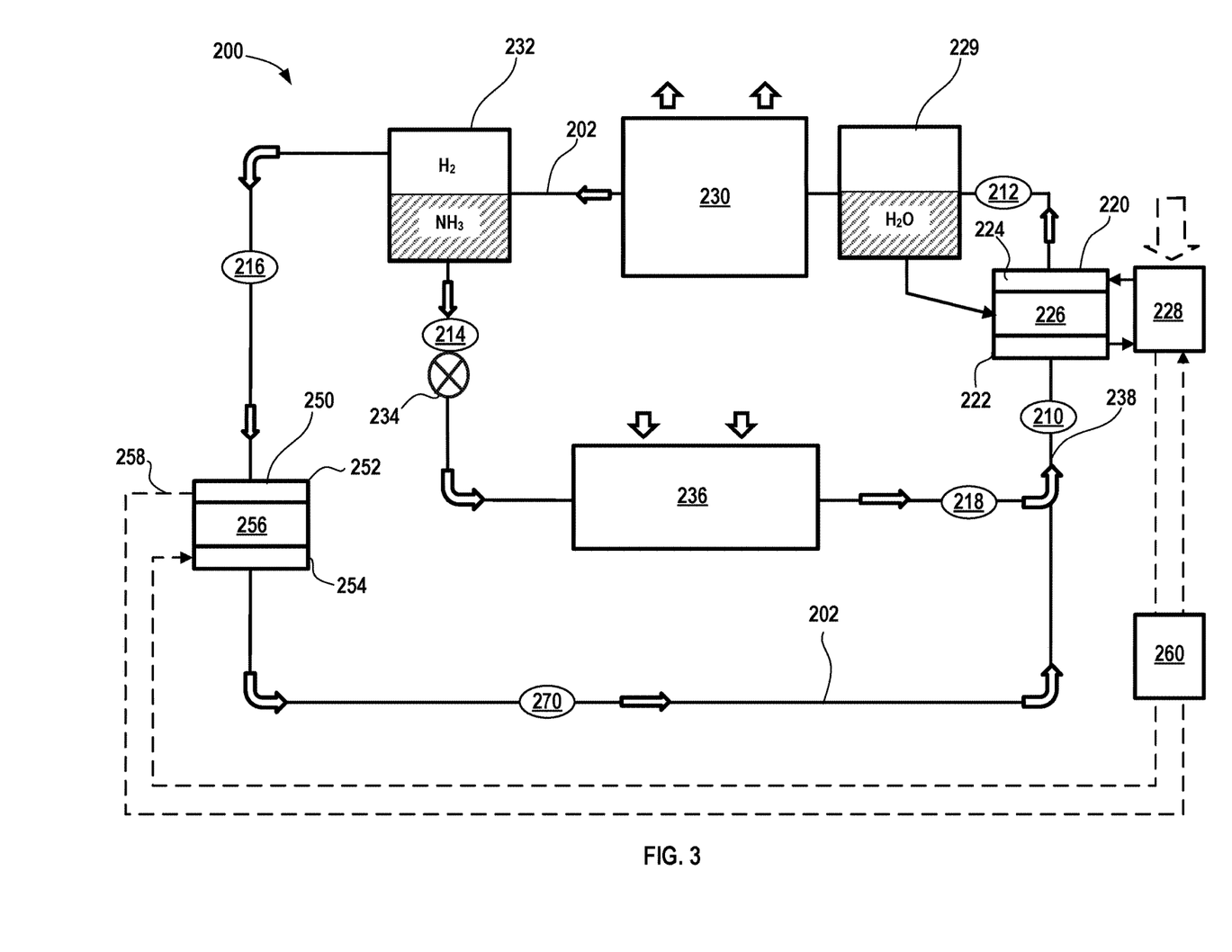
FIG. 3 illustrates a second electrochemical climate control system according to certain aspects of the present disclosure that processes a working fluid comprising ammonia ($NH_3$) and hydrogen ($H_2$) and contains a first electrochemical device that processes ammonia ($NH_3$) and hydrogen ($H_2$) and a second electrochemical device that serves an expander for hydrogen ($H_2$) gas.

In FIG. 3, another variation of an electrochemical climate control system 200 is shown that processes and circulates a working fluid having a composition comprising ammonia ($NH_3$) and hydrogen ($H_2$). As previously discussed, the working fluid may also include water ($H_2O$) at certain points in the system 200, for example, where a membrane in an electrochemical cell is present. To the extent that the components are similar to those described in FIGS. 1 and 2 above, for brevity, the detail of their operation will not be repeated unless otherwise noted herein. Like the previous embodiment, the working fluid may have a substantially different pressure at different points throughout the system 200, as discussed in the context of FIG. 2. The electrochemical climate control system 200 has a fluid flow path or fluid conduit 202 that establishes fluid communication between the various components, so that the working fluid may circulate in a loop as discussed further herein. At point 210 in the fluid conduit 202, the working fluid comprises a combination of both ammonia ($NH_3$) and hydrogen ($H_2$) that are in a vapor phase and a gas phase, respectively. As noted above and in the context of FIG. 2, a first partial pressure for hydrogen ($H_2$) may be substantially greater than a second partial pressure for ammonia ($NH_3$) in the working fluid at point 210. At point 210, the working fluid has a relatively low pressure. Next, the working fluid passes into a first electrochemical device 220 having a negative electrode or anode 222, a positive electrode or cathode 224, and a separator membrane 226. The first electrochemical device 220, including anode 222, cathode 224, and separator membrane 226 may be the same as and operated like those described above in the context of FIG. 1. Briefly, when electrical potential is applied to the first electrochemical device 220, ammonium cations ($NH_4^+$) and electrons (e) are transferred from the anode 222 to the cathode 224. The ammonium cations ($NH_4^+$) pass through the separator membrane 226 to the cathode 224. The electrons generated pass through an external circuit 228. In the simplified version of FIG. 3, the current collectors, terminals/tabs, and external power source are not shown. The ammonium cations ($NH_4^+$) travel through separator membrane 226 to the cathode 224 side by electrical field; while electrons travel to cathode 224 from the anode 222 by the electrical power supply circuit.

As noted previously, water ($H_2O$) may be added to the system to improve the functionality of the separator membrane 226, for example, and the system 200 may include a water separator 229 to recover water from the working fluid as it exits the first electrochemical device 220 and so that water is recycled back to the separator membrane 226.

In this manner, at point 212, the working fluid has a higher total pressure as it exits the first electrochemical device 220 and comprises a combination of both ammonia ($NH_3$) in a vapor phase and hydrogen ($H_2$) in a gas phase. In certain variations, the second partial pressure of the ammonia ($NH_3$) is increased in the first electrochemical device 220, while the first partial pressure of hydrogen ($H_2$) decreases. Thus, as point 212, the working fluid exiting the first electrochemical device 220 comprises a combination of both ammonia ($NH_3$) in a vapor phase and hydrogen ($H_2$) in a gas phase. Electrochemical compressor 220 thus receives low pressure working fluid comprising a mixture of ammonia ($NH_3$) vapor and hydrogen ($H_2$) gas and compresses this mixture to a higher pressure at point 212.

Next, the working fluid comprising ammonia ($NH_3$) and hydrogen ($H_2$) enters a condenser 230. In the condenser 230, ammonia ($NH_3$) transforms from a vapor phase to a liquid phase, while hydrogen ($H_2$) remains as a gas phase as it exits the condenser 230. In the condenser 230, the working fluid is cooled and expels heat from the electrochemical climate control system 200, as shown by the arrows. The condenser 230 may be located in a room or space where heat may be expelled, for example, outdoors. Next, the working fluid passes into a separator that serves as an ammonia separator 232. The liquid phase ammonia ($NH_3$) is thus separated from gas phase hydrogen ($H_2$) in the ammonia separator 232. The working fluid at this point is thus separated into two distinct streams, a first stream (designated by point 214) comprising liquid ammonia ($NH_3$) and a second stream (designated by point 216) comprising gas phase hydrogen ($H_2$). As noted above, separation efficiency may not be 100% and therefore small amounts of the ammonia may be present in the second stream 216 containing predominantly hydrogen and vice versa, namely that small amounts of hydrogen may be present in the first stream 214 containing predominantly ammonia.

The liquid ammonia ($NH_3$) in the first stream 214 next passes into an expansion valve 234. The expansion valve 234 causes ammonia ($NH_3$) in first stream 214 to expand, so that pressure is removed from the liquid refrigerant to allow expansion or change of state from a liquid to a gas in an evaporator 236. Cooling of the liquid ammonia ($NH_3$) accompanies the loss of pressure after passing through the expansion valve 234. Next, the liquid ammonia ($NH_3$) passes into the evaporator 236 to transform from a liquid to a vapor at point 218 to provide necessary refrigeration effect, where the cooling effect of endothermic energy absorption is shown by arrows. The evaporator 236 may be located in a room or space to be cooled by the electrochemical climate control system 200 or used to cool air flowing into a room or space in which cooling is desired. The vapor phase ammonia ($NH_3$) exiting the evaporator 236 is directed to an inlet conduit 238 that leads to an inlet of anode 222 of the first electrochemical device 220. In the inlet conduit 238, the vapor phase ammonia ($NH_3$) is blended with gas phase hydrogen ($H_2$) and thus, while not shown, there may be one or more components for routing flow and mixing/blending the streams into inlet conduit 238.

The gas phase hydrogen ($H_2$) separated in the ammonia separator 232 in the second stream 216 is directed towards a second electrochemical device 250. The second electrochemical device 250 serves as an electrochemical membrane expander, where during a pressure reduction process, electrical power/electricity is generated. In this manner, the reactions in the second electrochemical device 250 are distinct from those in the first electrochemical device 220, because only hydrogen is processed in the second electrochemical device 250. Thus, the second stream 216 enters into the second electrochemical device 250 having a negative electrode or anode 252, a positive electrode or cathode 254, and a separator membrane 256.

Briefly, electricity is generated by the second electrochemical device 250 when protons (W) and electrons (e) are transferred from the anode 252 to the cathode 254. The protons (W) pass through the separator membrane 256 to the cathode 254. The electrons generated pass through an external circuit 258. The protons ($H^+$) travel through separator membrane 256 to the cathode 254 side by electrical field; while electrons travel to the cathode 254 from the anode 252. In the cathode 254, the electrons and protons recombine to form hydrogen gas. A pressure of hydrogen gas entering the anode 252 is thus reduced after being processed by the second electrochemical device 250 when it exits the cathode 254. Further, the electricity generated in the external circuit 258 of the second electrochemical device 250 can be routed in an electrical conduit 260 to the first electrochemical device 220. The electricity/potential generated by the second electrochemical device 250 may be used to supplement or substitute for electricity provided by an external power source (not shown). Thus, the electricity/potential generates electricity so that the net power consumption of the electrochemical climate control system 200 is reduced. The hydrogen gas phase leaving the second electrochemical device 250 (serving as an expander) has a lower pressure at point 270, which then mixes with gas phase ammonia in the inlet conduit 238 that has exited from the evaporator 236, where it then enters the first electrochemical device 220.

In various aspects, the electrochemical climate control systems provided by the present disclosure that incorporate electrochemical devices can provide pump-less refrigeration (e.g., with no pumps, moving parts, and no oil), while using ammonia as a refrigerant and at least one electrochemical device as an electrochemical compressor that provide high energy efficiencies. The concerns about potential corrosion are thus eliminated. The climate control systems provide higher operational and system efficiency and in certain variations may have a constant pressure. Accordingly, in such embodiments, the same full pressure can be provided across the separator membrane in the electrochemical device(s), translating to little or no mechanical stress.

In certain aspects, the disclosure also contemplates methods of operating the electrochemical climate control systems described above. In one variation, the method may comprise circulating a working fluid comprising ammonia ($NH_3$) and hydrogen ($H_2$) in an electrochemical climate control system having a fluid conduit that fluidly couples various components. First, the working fluid enters an evaporator to evaporate liquid ammonia ($NH_3$) in the working fluid to vapor phase ammonia ($NH_3$). The working fluid is passed to a heat exchanger disposed downstream of the evaporator, where it is heated and then enters an electrochemical device. The electrochemical device receives the working fluid comprising ammonia ($NH_3$) and hydrogen ($H_2$) from the heat exchanger. In certain variations, an electrical potential is applied to the electrochemical device so that in processing the working fluid, a first partial pressure of gas phase ammonia ($NH_3$) is increased, while a second partial pressure of gas phase hydrogen ($H_2$) is reduced. After exiting the electrochemical device, the working fluid enters a condenser that cools the working fluid and transforms ammonia ($NH_3$) in the working fluid from the vapor phase to a liquid phase. The working fluid then enters a separator that separates the liquid phase ammonia ($NH_3$) from gas phase hydrogen ($H_2$) in the working fluid, so that separated liquid phase ammonia ($NH_3$) is directed to the evaporator and transformed to vapor phase ammonia ($NH_3$). Evaporation of the liquid phase ammonia ($NH_3$) provides a refrigeration effect. After exiting the evaporator, vapor phase ammonia ($NH_3$) is fed to the heat exchanger, while the gas phase hydrogen ($H_2$) exiting the separator is directed to the heat exchanger. The working fluid may then be recirculated back to the electrochemical device.

In another variation, the method may comprise circulating a working fluid comprising ammonia ($NH_3$) and hydrogen ($H_2$) in an electrochemical climate control system having a fluid conduit that fluidly couples various components. First, the working fluid enters an evaporator to evaporate liquid ammonia ($NH_3$) in the working fluid to vapor phase ammonia ($NH_3$). This evaporation provides a refrigeration effect. The working fluid is passed to an ejector that combines and pressurizes vapor phase ammonia ($NH_3$) received from the evaporator and a distinct stream of a gas phase hydrogen ($H_2$) to form a pressurized gas stream. The pressurized gas stream comprising ammonia ($NH_3$) and hydrogen ($H_2$) having an increased pressure then enters an electrochemical device. An electrical potential is applied to the electrochemical device so that in processing the working fluid, the working fluid is compressed to a higher pressure. In certain aspects, a first partial pressure of gas phase ammonia ($NH_3$) may be increased, while a second partial pressure of gas phase hydrogen ($H_2$) may be reduced after passing through the electrochemical device. After exiting the electrochemical device, the working fluid enters a condenser that cools the working fluid and transforms ammonia ($NH_3$) in the working fluid from the vapor phase to a liquid phase. The working fluid then enters a separator that separates liquid phase ammonia ($NH_3$) from gas phase hydrogen ($H_2$) in the working fluid, so that separated liquid phase ammonia ($NH_3$) is directed to the evaporator and transformed to gas phase ammonia ($NH_3$), while the gas phase hydrogen ($H_2$) exiting the separator forms the distinct stream that is fed to the ejector. The gas phase ammonia ($NH_3$) exiting the evaporator may likewise be fed to the ejector. After exiting the ejector, the pressurized gas stream can again be fed to the electrochemical device. Therefore, a mixture of vapor phase ammonia and gas phase hydrogen leaves the ejector and enters the electrochemical compressor at a pressure higher than the evaporator pressure, so the compression work required in the electrochemical device compressor is reduced.

In yet another variation, the method may comprise circulating a working fluid comprising ammonia ($NH_3$) and hydrogen ($H_2$) in an electrochemical climate control system having a fluid conduit that fluidly couples various components. First, the working fluid enters a first electrochemical device. An electrical potential is applied to the first electrochemical device so that in processing the working fluid, the working fluid is compressed to a higher pressure. In certain aspects, a first partial pressure of gas phase ammonia ($NH_3$) is increased, while a second partial pressure of gas phase hydrogen ($H_2$) is reduced. After exiting the electrochemical device, the working fluid enters a condenser that cools the working fluid and transforms ammonia ($NH_3$) in the working fluid from the vapor phase to a liquid phase. The working fluid then enters a separator that separates liquid phase ammonia ($NH_3$) from gas phase hydrogen ($H_2$) in the working fluid, so that separated liquid phase ammonia ($NH_3$) is directed to an evaporator. In the evaporator, the liquid ammonia ($NH_3$) is evaporated and transformed to vapor phase ammonia ($NH_3$) to provide a refrigeration effect. The gas phase hydrogen ($H_2$) exiting the separator is directed to a second electrochemical device. The second electrochemical device decreases a pressure of gas phase hydrogen ($H_2$) received from the separator acting like an expander and further generates electrical potential. The electrical potential generated in the second electrochemical device is then transferred to the first electrochemical device.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A climate control system comprising:
   a working fluid comprising ammonia ($NH_3$) and hydrogen ($H_2$);
   an evaporator that transforms liquid ammonia ($NH_3$) in the working fluid to a vapor phase;
   a heat exchanger disposed downstream of the evaporator and upstream of an electrochemical device;
   the electrochemical device that receives the working fluid from the heat exchanger comprising ammonia ($NH_3$) and hydrogen ($H_2$), wherein the electrochemical device increases a first partial pressure of a vapor phase ammonia ($NH_3$) and decreases a second partial pressure of a gas phase hydrogen ($H_2$) as the working fluid passes through the electrochemical device when an electrical potential is applied thereto;
   a condenser disposed downstream of the electrochemical device that cools the working fluid and transforms ammonia ($NH_3$) in the working fluid from the vapor phase to a liquid phase;
   a separator disposed downstream of the condenser and upstream of the evaporator and the heat exchanger, the separator being configured to separate liquid phase ammonia ($NH_3$) from gas phase hydrogen ($H_2$) so that separated liquid phase ammonia ($NH_3$) is directed to the evaporator and transformed to vapor phase ammonia ($NH_3$) that is fed to the heat exchanger, while the gas phase hydrogen ($H_2$) exiting the separator is directed to the heat exchanger; and
   a fluid conduit for circulating the working fluid and establishing fluid communication between the evaporator, the heat exchanger, the electrochemical device, the condenser, and the separator, and through which the working fluid circulates.

2. The climate control system of claim 1, wherein the separator is a first separator and the climate control system further comprises a second separator disposed between the electrochemical device and the condenser, wherein the working fluid further comprises water ($H_2O$) and the second separator is configured to separate water ($H_2O$) from ammonia ($NH_3$) and hydrogen ($H_2$) in the working fluid after exiting the electrochemical device, wherein the separated water ($H_2O$) is circulated back to the electrochemical device.

3. The climate control system of claim 1, wherein the heat exchanger is a counterflow heat exchanger that has a first side in heat transfer relationship with a second side.

4. The climate control system of claim 1 that is free of any mechanical pumps.

5. The climate control system of claim 1, wherein the electrochemical device comprises a positive electrode, a negative electrode, and a separator membrane that permits transport of ammonium ($NH_4^+$) ions therethrough.

6. The climate control system of claim 1, wherein the first partial pressure of the vapor phase ammonia ($NH_3$) entering the electrochemical device is less than or equal to about 50% of a total pressure of the working fluid and the second partial pressure of the gas phase hydrogen ($H_2$) is greater than or equal to about 50% of the total working pressure of the working fluid, and the first partial pressure of the gas phase ammonia ($NH_3$) exiting the electrochemical device is greater than or equal to about 50% of a total pressure of the working fluid and the second partial pressure of the gas phase hydrogen ($H_2$) is less than or equal to about 50% of the total working pressure of the working fluid.

7. A climate control system comprising:
   a working fluid comprising ammonia ($NH_3$) and hydrogen ($H_2$);
   an evaporator that transforms liquid ammonia ($NH_3$) in the working fluid to a vapor phase;
   a counterflow heat exchanger disposed downstream of the evaporator that has a first side in heat transfer relationship with a second side;
   an electrochemical device that receives the working fluid from the heat exchanger comprising ammonia ($NH_3$) and hydrogen ($H_2$), wherein the electrochemical device increases a first partial pressure of a vapor phase ammonia ($NH_3$) and decreases a second partial pressure of a gas phase hydrogen ($H_2$) as the working fluid passes through the electrochemical device when an electrical potential is applied thereto;
   a condenser disposed downstream of the electrochemical device that cools the working fluid and transforms ammonia ($NH_3$) in the working fluid from the vapor phase to a liquid phase;
   a separator disposed downstream of the condenser and upstream of the evaporator and the heat exchanger, the separator being configured to separate liquid phase ammonia ($NH_3$) from gas phase hydrogen ($H_2$) so that separated liquid phase ammonia ($NH_3$) is directed to the evaporator and transformed to vapor phase ammonia ($NH_3$) that is fed to the heat exchanger, while the gas phase hydrogen ($H_2$) exiting the separator is directed to the first side of the heat exchanger and the second side of the heat exchanger is configured to receive a feed stream of the working fluid to be directed to the electrochemical device, wherein the feed stream comprises vapor phase ammonia ($NH_3$) exiting the evaporator, wherein the heat exchanger is configured to transfer heat from the first side to the second side to cool the gas phase hydrogen ($H_2$) and heat the feed stream; and
   a fluid conduit for circulating the working fluid and establishing fluid communication between the evaporator, the heat exchanger, the electrochemical device, the condenser, and the separator, and through which the working fluid circulates.

8. The climate control system of claim 7, wherein the separator is a first separator and the climate control system further comprises a second separator disposed between the electrochemical device and the condenser, wherein the working fluid further comprises water ($H_2O$) and the second separator is configured to separate water ($H_2O$) from ammonia ($NH_3$) and hydrogen ($H_2$) in the working fluid after exiting the electrochemical device, wherein the separated water ($H_2O$) is circulated back to the electrochemical device.

9. The climate control system of claim 7, wherein after the gas phase hydrogen ($H_2$) exits the first side of the heat exchanger as a cooled gas phase hydrogen ($H_2$), at least a portion of the cooled gas phase hydrogen ($H_2$) is introduced into the feed stream prior to entering the second side of the heat exchanger.

10. The climate control system of claim 7 that is free of any mechanical pumps.

11. The climate control system of claim 7, wherein the electrochemical device comprises a positive electrode, a negative electrode, and a separator membrane that permits transport of ammonium ($NH_4^+$) ions therethrough.

12. The climate control system of claim 7, wherein the first partial pressure of the vapor phase ammonia ($NH_3$) entering the electrochemical device is less than or equal to about 50% of a total pressure of the working fluid and the second partial pressure of the gas phase hydrogen ($H_2$) is greater than or equal to about 50% of the total working pressure of the working fluid, and the first partial pressure of the gas phase ammonia ($NH_3$) exiting the electrochemical device is greater than or equal to about 50% of a total pressure of the working fluid and the second partial pressure of the gas phase hydrogen ($H_2$) is less than or equal to about 50% of the total working pressure of the working fluid.

* * * * *